United States Patent
Winkelmann et al.

[11] Patent Number: 6,076,645
[45] Date of Patent: Jun. 20, 2000

[54] RING PISTON SEAL FOR A HYDRAULICALLY CONTROLLED DISCONNECT SYSTEM

[75] Inventors: Ludwig Winkelmann, Erlangen; Harald Peschke, Veitsbronn, both of Germany

[73] Assignee: INA Wälzlager Schaeffler oHG, Herzogenaurach, Germany

[21] Appl. No.: 09/142,214

[22] PCT Filed: Dec. 13, 1996

[86] PCT No.: PCT/EP96/05599

§ 371 Date: Sep. 2, 1998

§ 102(e) Date: Sep. 2, 1998

[87] PCT Pub. No.: WO97/33097

PCT Pub. Date: Sep. 12, 1997

[30] Foreign Application Priority Data

Mar. 4, 1996 [DE] Germany ............................ 196 09 472

[51] Int. Cl.[7] .................................................. F16D 25/08
[52] U.S. Cl. .................. 192/85 CA; 192/91 A; 92/165 R; 277/551; 277/577
[58] Field of Search ............................ 192/85 CA, 91 A, 192/98, 30 V; 92/107, 165 R; 277/436, 437, 551, 554, 555, 558, 560, 566, 572, 577

[56] References Cited

U.S. PATENT DOCUMENTS

| | | |
|---|---|---|
| 2,549,818 | 4/1951 | Joy . |
| 3,848,880 | 11/1974 | Tanner . |
| 4,821,627 | 4/1989 | Leigh-Monstevens . |
| 4,827,834 | 5/1989 | Leigh-Monstevens ......... 192/85 CA X |
| 5,113,991 | 5/1992 | Kajitani et al. . |
| 5,287,951 | 2/1994 | Voit et al. .......................... 192/85 CA |
| 5,458,224 | 10/1995 | Takano ............................... 192/85 CA |

FOREIGN PATENT DOCUMENTS

| | | |
|---|---|---|
| 713133 | 11/1962 | Germany . |
| 1 187 872 | 2/1965 | Germany . |
| 7044281 | 4/1971 | Germany . |
| 26 10 584 B2 | 4/1978 | Germany . |
| 79 00 776 U | 7/1979 | Germany . |
| 39 90 401 T1 | 6/1990 | Germany . |
| 41 29 370 A1 | 3/1993 | Germany . |
| 31 48 183 A1 | 6/1993 | Germany . |
| 43 39 652 A1 | 6/1994 | Germany . |
| 195 18 833 A1 | 11/1996 | Germany . |
| WO 90/02274 | 3/1990 | WIPO . |
| WO 96/24782 | 8/1996 | WIPO . |

OTHER PUBLICATIONS

Simrit–Werk brochure, pp. 10 and 11, dated Jun. 1972.
Martin Merkel GmbH product information brochure,undated.
German Office Action dated Sep. 16, 1996 for Application No. 196 09 472.0.
International Search Report dated Apr. 1, 1997 for related International Application No. PCT/EP9605599.

*Primary Examiner*—Richard M. Lorence
*Attorney, Agent, or Firm*—Akin, Gump, Strauss, Hauer & Feld, L.L.P.

[57] ABSTRACT

A hydraulically controlled disconnect system for a friction clutch of motor vehicles is provided and is constructed as a slave cylinder which includes a pressure housing (2) which is arranged concentrically in relation to a gear box input shaft (3). A guiding sleeve is arranged radially apart from the pressure housing to create a circularly configured pressure chamber (9) in which a ring piston (7) is axially guided and movable. A reinforced seal (8a) on the pressure chamber side of the ring piston (7). The seal (8a) includes sealing lips (14, 15) which are arranged radially spread apart. In accordance with the invention, the reinforcement (18a) of the seal (8a) is held form-locking on the ring piston (7) with a degree of axial and radial freedom.

23 Claims, 4 Drawing Sheets

RING PISTON SEAL FOR A HYDRAULICALLY CONTROLLED DISCONNECT SYSTEM

BACKGROUND OF THE INVENTION

The invention is directed to a hydraulically controlled disconnect system for a friction clutch of vehicles with a manually shiftable transmission, whereby the disconnect system has slave cylinder with a pressure housing which is arranged concentrically on a gear box input shaft which connects an internal combustion engine with the gear shift drive, whereby a guide sleeve is arranged at a radial distance from the pressure housing to form a circularly shaped pressure chamber, and a ring piston is movably guided axially in the pressure chamber, which is provided with a seal on its pressure chamber side, the sealing lips of which are arranged radially spread apart.

Disconnect systems of the above-mentioned type of construction are generally known and find application in motor vehicles. A representative disconnect system is known from DE-C 31 48 183 in which a ring piston axially delimits a pressure chamber. A sealing ring is allocated on the pressure chamber side of the ring piston, the sealing lips of which lie radially spread apart sealing on the components between which the ring piston is guided. The rigid sealing arrangement on the ring piston provided in this known disconnection system has the disadvantage that, for example, axial vibrations, which are triggered by the crankshaft of the internal combustion engine, are transmitted through the friction clutch and the clutch disconnect bearing to the ring piston, and from there undamped into the hydraulic system. These pressure oscillations can initiate a disadvantageous "crawling" on the clutch pedal which reduces comfort.

A further ring piston seal is known from U.S. Pat. No. 4,821,627 in which a radial extension on one side of the ring piston is sprayed on nearly all sides by sealing material. Even this solution makes no vibration compensation possible so that the vibrations are likewise transmitted undamped to the clutch pedal as before.

Furthermore, clutch disconnecting systems are known in connection with which the seal has no connection on the ring piston. The seal is moreover held in a separate seal carrier which is axially introduced to the ring piston. This solution is very much subject to disturbance and requires, for example, a secondary suction-sensitive valve for a vacuum filling of the disconnecting system.

SUMMARY OF THE INVENTION

Underlying the invention is the object of creating a seal which:

- avoids a rigid connection to the ring piston,
- makes possible an axial reduction in overall length while simultaneously optimizing the guide length of the ring piston,
- reduces seal friction, and
- is producible economically and makes a simple assembly possible.

The present invention is for a hydraulically controlled disconnecting system for a friction clutch of a motor vehicle with a manually shiftable gear box. The disconnect system includes a slave cylinder with a pressure housing which is arranged concentrically in relation to a gear box input shaft which connects an internal combustion engine with the gear box. A guiding sleeve is arranged radially apart from and in a longitudinal bore of the pressure housing to form a circularly configured pressure chamber, and a ring piston is axially guided and movable in the pressure chamber. A reinforced seal is located on the pressure chamber side of the piston. the reinforced seal includes sealing lips which are arranged radially spread apart in a V-shape.

In accordance with one embodiment of the Invention, the seal has a reinforcement which is held form-locked on the ring piston, whereby the attachment permits a limited axial and radial mobility. This inventive feature makes possible a desired degree of freedom of the seal in relation to the ring piston so that the seal can execute an independent adjustment motion in the event of an unfavorable stress. With the previously known seal arrangement, a stress unfavorable for the seal can occur during the coupling and decoupling operation of the release bearing, as this must compensate for a certain webbing behavior due to a certain radial displacement. On the basis of the movable coupling of the seal on the ring piston in accordance with the present invention, an even sealing lip excursion is possible such that sealing lip wear and tear is diminished, and the leakage danger of the seal is reduced. No feeding problem occurs during a vacuum filling of the hydraulic system owing to the restricted axial mobility of the seal in relation to the ring piston.

The seal connection of the invention moreover effectively compensates for or dampens a transmission of axial vibrations triggered by the crankshaft of the internal combustion engine to the hydraulic system. The restricted axial and radial mobility of the seal makes it possible for very frequently occurring axial vibrations of small amplitude only to trigger an agitation of the clutch release bearing and of the ring piston connected with it. But a disadvantageous transmission of pressure surges on the seal and on the hydraulic system connected with it does not occur due to the axial flexibility of the seal.

Based on the form-locking seal held preferably in the area of a radial edge zone of the ring piston, a reduction of the overall length of the seal advantageously is possible with a simultaneously greater guidance length of the ring piston, so that an optimal guidance of the ring piston results to improve the functional capacity and the lifetime of the disconnect system. The form-locking attachment of the seal on the ring piston provided in this manner furthermore makes possible an automatable assembly, which is desirable for the production of a large number of pieces of the disconnecting system.

Another embodiment of the Invention provides a seal which is connected in one piece with a leg made of the sealing material. The leg is play-limiting, that is, held form-locking on the ring piston with axial and radial play. This seal assembly-optimized configuration represents a further cost advantage due to its one piece construction. All remaining advantages presented in connection with the first embodiment are likewise transferrable to the invention in accordance with the second embodiment.

In an advantageous configuration of both preferred embodiments of the invention, the seal is provided with a cross section profile which has sealing lips arranged asymmetrically in relation to each other. With this measure, identical symmetrical forces of friction are attainable on the sealing lips which provide an improved wear and tear quality for the seal. The sealing lip configuration of the invention makes possible a harmonization of sealing lip stress corresponding to the difference in diameter between the radially inner and radially outer sealing lip. Alternatively, by utilizing different wall thicknesses of sealing lips, rigidities which diverge from each other can be attained. Preferably, the radially outer sealing lip is strengthened, owing to which this is more rigid in the event of pressurization in comparison to the radially inner sealing lip. A difference in wall strength of the sealing lips and/or different sealing lip lengths advantageously makes possible the sought equal axial tensions and/or strains in the sealing lips of the ring piston seal set apart radially. The seal configured in accordance with the invention accordingly effectively prevents a disadvantageous twisting of the seal or an extrusion which has an advantageous effect on the durability or lifetime of the seal. This seal construction furthermore makes an improvement in efficiency possible without at the same time exerting a disadvantageous effect on the manufacturing costs of the seal and the assembly.

A preferred embodiment of the invention provides a leg for a reinforcement. Or for the seal provided in one piece with a leg, it provides that the leg radially overlaps the ring piston on the pressure chamber side to a limited extent. Moreover, on the free end of the leg, a locking element which is radially oriented in the direction of the ring piston is provided which in an installed position of the seal latches in an appropriate recess of the ring piston, such as a piston groove. For providing an axial and radial mobility of the seal, the locking element possesses an extension in length exceeding the axial width of the locking device. Moreover, a radial play occurs between the leg contour which extends toward ring piston and the recess on the ring piston.

A further configuration of the locking device provides that the seal leg partially surrounds the ring piston on the pressure chamber side on the end side in the end region, whereby the locking device is provided on the radially outer leg. A further preferred configuration of the invention provides a form-locking surrounding of the sealing ring back by the reinforcement. This sealing attachment on the reinforcement represents an alternative to the previously typical vulcanization or gluing which is provided to create an inseparable connection between the reinforcement and the seal. These previously explained reinforcements form a radially oriented plane surface which is braced frontally on the ring piston and which passes over into an axially running leg in both end zones, owing to which the guide surfaces on the piston are enlarged. The axially projecting legs joining with the flat surfaces moreover serve to reduce the extrusion of the sealing material.

An axially running leg of the reinforcement, at least regionally sprayed on the outside with sealing material is an effective protection in accordance with the invention in the event of a possibly occurring large radial movement of the sealing ring up to the seat for one of the guide surfaces of the ring piston, that is the guiding sleeve or the longitudinal bore in the pressure housing. The elastomer coating applied in thin layers in this connection prevents damage to the piston ring and seal track which can lead to an impairment of function, especially leakage, in the event of a radial displacement of the seal in the area of the reinforcement.

For simplification of the manufacturing procedure, the invention provides for non-cutting forming of the catches only after spraying the legs on the outside has taken place. With this measure, the support can be better braced during the spraying process of the seal.

To create a pressure equilibrium during spraying of the seal, the reinforcement is provided with a recess in the area of a radial segment, that is a flat surface. With this measure, a deformation of the reinforcement during the spraying process is prevented, owing to which a simplification of the manufacturing process results. Preferably providing an edge zone of the recess with a segment or a bend arranged axially displaced in the direction of the back of the seal which, when coated by sealing material, assures a form-locking connection.

In a further construction of the invention, the leg is provided with a circular torus directed radially in relation to the ring piston to create an effective locking of the seal on the ring piston. As an alternative, the ring piston is provided with formed cams which latch in corresponding hollows or openings of the leg in the assembled position.

To improve the sealing action of the sealing lips, the invention provides inserting a spreading spring in the area of the V-shaped recess arranged on the pressure chamber side. This external springing of the sealing lips makes possible the use of various contact media in the disconnect system.

As a material for the seal of the invention configured in one piece, PTFE is used, which possesses a sufficient rigidity and is distinguished by favorable wear and tear values as well.

A thin-walled steel plate is provided as material for the reinforcement with which the reinforcement is producible economically without cutting by a deep drawing process. To obtain a maximal guidance length of the ring piston, the reinforcement has a wall thickness of at least 0.3 mm in the plane surface region.

For improving reinforcement rigidity, the present invention provides for strengthening the radial segment of the reinforcement, the plane surface, for up to 90% of the width of the back of the seal. The reinforcement is thereby correspondingly strengthened while maintaining the specified seal width, and the size of the back of the seal is reduced. A correspondingly stiffened reinforcement can be manufactured as an automated turned piece as an alternative to a non-cutting production as an automated turned piece.

For the preferred dimensions of the play-limiting form-locking connection of the seal on the ring piston, an axial play "X" of <2 mm has proven to be appropriate. In contrast, a dimension <1.5 mm is provided as radial play "Y."

In an advantageous configuration of the seal which is provided with sealing lips arranged asymmetrically in relation to each other and which have divergent sealing lip lengths, a V-shaped recess is so arranged between the radially spread apart sealing lips having a center which forms a radial offset that extends from the pressure chamber center in the direction of the guiding sleeve. With this measure, a wall thickness of the respective sealing lip is attainable which is almost constant from the free end of the sealing lip up to the uniting of these on the back of the seal. It was possible to determine an optimal wall strength proportion experimentally in which the wall thickness of the radially outer lip has a 10% greater value.

A dimension of $\leq 4$ mm has proven appropriate as a dimension for the axial projection, that is a length difference "X" between the radially inner sealing lip in comparison with the radially outer sealing lip.

The following geometrical proportions were determined in designing the seal of the invention for optimizing seal quality. The value of 0.5 to 1 was established for the entire seal width in relation to the compartment, that is the radial distance measurement of the contact surfaces of both sealing lips in the installed state. The value of 0.4 to 0.8 was also established as an optimal relationship of the axial width of the back of the seal to the overall seal width.

For selective influence of the pressure gradient "dp/dl," that is, the contact pressure "p" over the relative length "l" of the seal between the fluid side of the sealing lips and the side pointing turned away from this in the direction of the seal, the sealing lips of the invention are provided with the following exterior contour. In a transition zone between a cylindrical segment at the free end of the sealing lips and an oblique segment pointing in the direction of the back of the seal proceeding from the seal edge, a radius of ≧30° is provided which passes over into the straight running segment at a point of tangency. This point of tangency can be arranged set apart from or identical with a further point of tangency which is determined by a further radius which is provided in a transition zone between the back of the seal and the segment. By the calculation procedure for optimizing the seal contour, it was possible to establish a radial proportion of dimensions of the radial dimension ≧0.5 from the back of the seal up to the point of tangency set in relation to the radial dimension from the back of the seal up to the seal edge. For the oblique segment running in a straight line between the two points of tangency, it was possible to establish a value of ≧0. This sealing ring configuration makes possible a contact compression "p" of the sealing lips over the relative length "l" which, regarded from the fluid side, forms a first of all desired steep pressure gradient, that is, a constantly rising pressure profile until reaching the pressure edge. A flat running pressure gradient continues from the seal edge in the direction of the base of the seal, that is, a continuously falling pressure profile. The diverging pressure gradient curve positively influences the wear and tear behavior of the sealing lips, as these are not disadvantageously exposed to high edge pressure. The sealing lip contour of the invention furthermore favors the sealing action of the sealing lips and the overall efficiency of the seal. The continuously dropping pressure profile on the side facing away from the fluid side of the sealing lips favors a desired constant oil film-filled clearance which makes possible a homogenous lubricant film thickness and therewith prevents a mixed friction increasing sealing lip wear and tear.

BRIEF DESCRIPTION OF THE DRAWINGS

The embodiments of the invention are shown in the seven drawing figures which are described below, wherein.

DETAILED DESCRIPTION OF THE DRAWINGS

Figure 1:
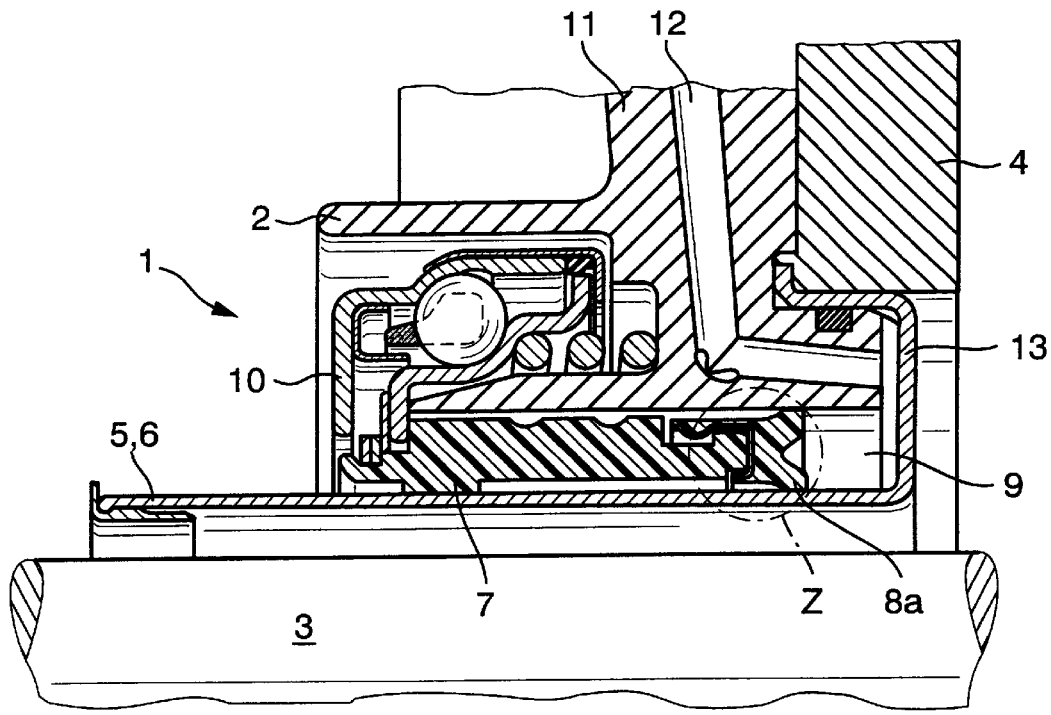
FIG. 1 shows a hydraulic disconnect system of the invention in cross-section.

A disconnect system 1 of the invention is illustrated in FIG. 1 in half section. The disconnect system 1 includes a pressure housing 2 which is arranged concentrically in relation to a gear box input shaft 3 and is separably fastened to a gear box housing 4. A guiding sleeve 5 arranged radially apart in relation to the gear box input shaft 3 as well as to the pressure housing 2 extends from against the pressure housing 2 over a larger axial width coaxial to the gear box input shaft 4. A ring piston 7 is guided axially and movable on a jacket surface 6 of the guiding sleeve 5 which, by means of a seal 8a, delimits a pressure chamber 9. A release bearing 10 is fastened on the side of the ring piston 7 facing away from the pressure chamber 9, which in the installed state lies force-locked on disconnect means of a friction clutch, which are not depicted in FIG. 1. The pressure chamber 9, which can be acted upon through a supply channel 12 in a pressure connection 11 of the pressure housing 2, is delimited axially on the gear box side by a ring flange 13 which is joined in one piece with the guiding sleeve 5. Since the disconnect system 1 does not generally differ from the known systems, a further description of component parts and the manner of functioning of the disconnect system is not provided.

Figure 2:
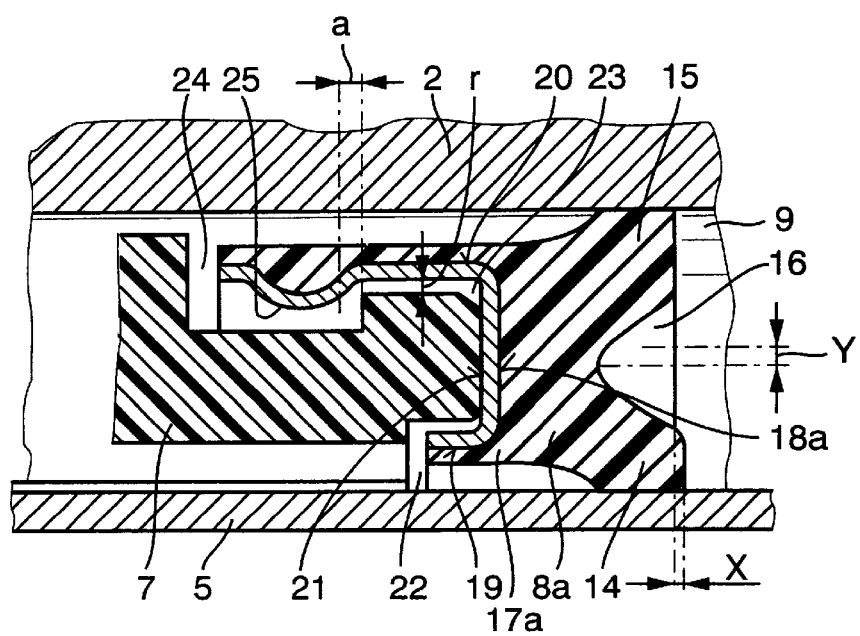
FIG. 2 shows an enlarged detail view of area "Z" in accordance with FIG. 1.

In FIG. 2, the detail "Z" in accordance with FIG. 1 is illustrated in an enlarged scale for clarification of the seal 8a of the invention. The configuration of the seal 8a provides asymmetrically arranged sealing lips 14, 15, in connection with which the radially inner sealing lip 14 lying on the guiding sleeve 5 has a smaller wall thickness than the radially outer sealing lip 15. On the pressure chamber side, the sealing lips 14, 15 are arranged spread apart to form a V-shaped recess 16 which is arranged with a radial offset "Y" toward the center of the pressure chamber 9 in the direction of the guiding sleeve 5. There moreover exists a difference in length "X" between the sealing lips 14, 15. That is, the sealing lip 14 is provided with a lesser wall strength, and is longer by the dimension "X" than the more strongly proportioned radially outer sealing lip 15. The seal 8a is inseparably joined with a reinforcement 18a lying on back 17a of the seal, for example by vulcanization. The reinforcement 18a, which has an approximately U-shaped profile, is provided with two legs 19, 20 of various lengths which surround the ring piston 7 on its end side. The reinforcement 18a forms a plane surface 21 between the legs 19, 20 over which the back side of the seal 8a is braced on the ring piston 7. To obtain a free radial and axial movability of the seal 8a in relation to the ring piston 7, the ring piston has ledges 22, 23 so that a wall thickness of the ring piston 7 is provided which is smaller than the radial distance between the legs 19, 20. In this manner, a radial play "r" is provided as well as a degree of freedom of the seal 8a in an axial direction. The axial play "a" is attained by a piston groove 24, the axial width and position of which is so arranged that a catch 25 arranged pointing radially inwardly in the end region of the leg 20 latches in the groove with an axial play in the installed state of the seal 8a. To avoid a disadvantageous contact of the legs 19, 20 of the reinforcement 8a on the pressure housing 2 or on the guiding sleeve 5, the legs 19, 20 are sprayed on the outside over the entire length with sealing material.

Figure 3:
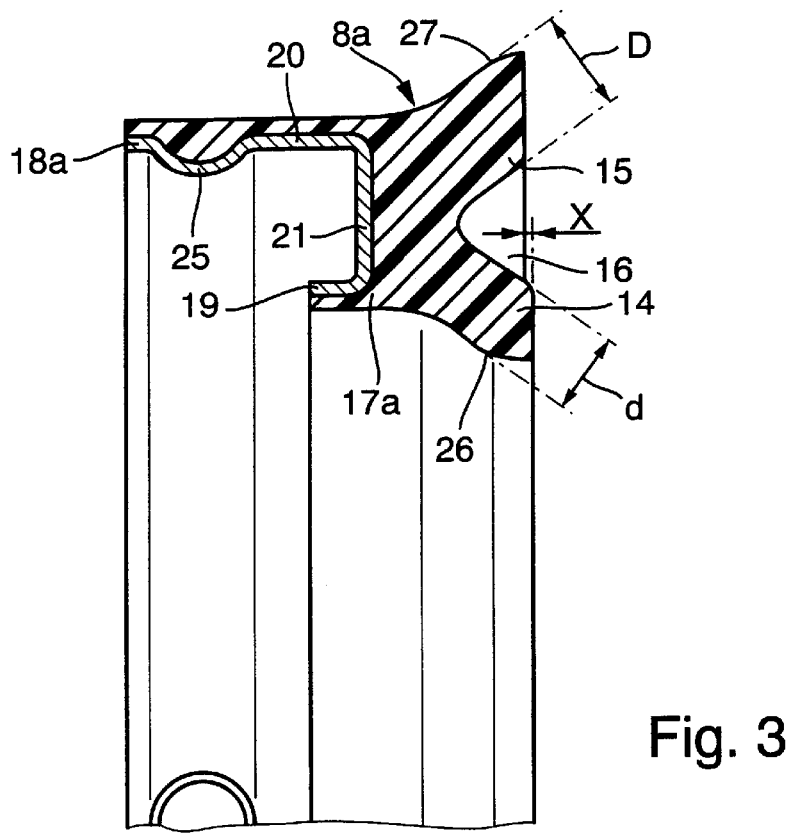
FIG. 3 shows an enlarged cross-section of the component part of the seal for the ring piston in accordance with FIG. 1.

In FIG. 3, the seal 8a is illustrated enlarged as an individual component to clarify some details. This illustration clearly shows a wall thickness difference between the sealing lips 14, 15. That is, the wall thickness "d" of the sealing lip 14 is clearly smaller than the wall thickness "D" of the sealing lip 15. Moreover, FIG. 3 shows that the wall thicknesses "d" and "D" of the sealing lips 13, 14 are constant over the entire length, with the exception of the exterior rounding at the free end for forming an end-sided cylindrical external contour. The representation of the seal 8a in the non-mounted state moreover makes clear the exterior contour of the seal 8a in the region of the sealing lips 14, 15, which first of all have a cylindrical segment on the pressure chamber side up to reaching a seal edge 26, 27.

Figure 4:
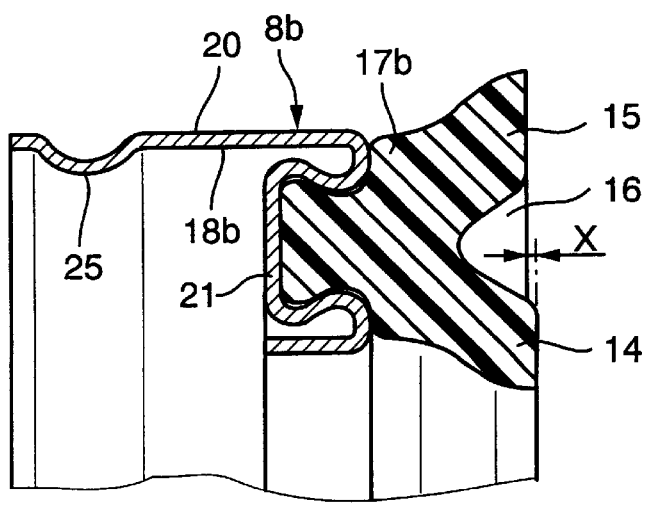
FIG. 4 shows an alternative to the reinforcement of the seal of the invention depicted in FIG. 3.

FIG. 4 depicts the seal 8b having a reinforcement 18b which surrounds a back area 17b of the back of the seal, in at least a partially form-locking manner. The arrangement and construction of the sealing lips 14, 15 here is the same as those of the seal 8a in accordance with FIG. 3. The reinforcement 18b makes possible a separable, form-locking coupling of the seal element to the reinforcement 18b and therewith represents an alternative to the coupling of the seal element to the reinforcement 18a in accordance with FIG. 3 in which these components are joined together by vulcanizing.

Figure 5:
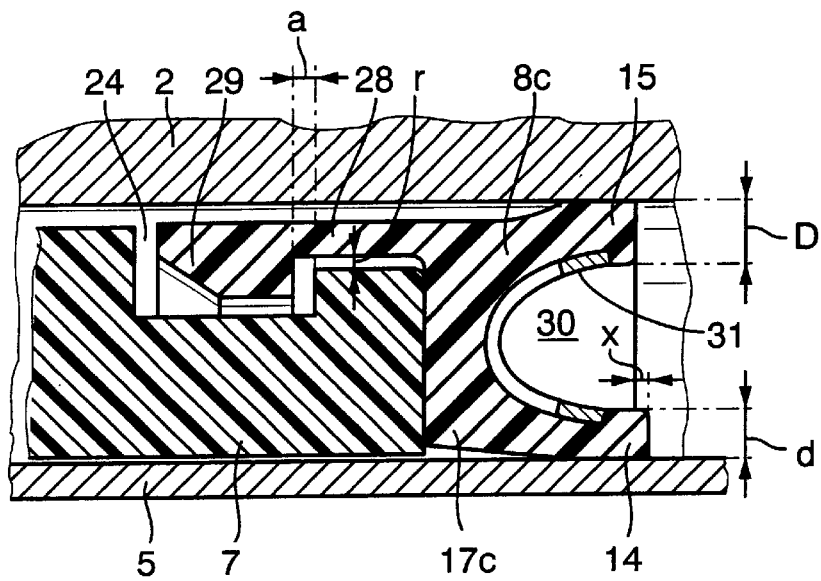
FIG. 5 shows an illustration similar to FIG. 2 in which the seal is provided with a leg in one piece which is latched form-locking on the ring piston.

The seal 8c illustrated in FIG. 5 represents a construction optimization in which a leg 28, connected in one piece with the seal element, is provided on the free end with a catch 29 which latches in the piston groove 24 in the installed state. The seal 8c is supported directly with the back 17c of the seal against the ring piston 7. In a similar manner to FIG. 2, the leg 28 and the catch 29 are constructed in view of the ring piston end side configuration so that an axial play "a" and a radial play "r" arise between these component parts. The sealing lips 14, 15 of the seal 8c are preferably made of PTFE, and likewise have different wall thicknesses "D" and "d", and include divergent sealing lips having differing lengths from each other, characterized by the difference in length "X." The sealing lips 14, 15 of the seal 8c are provided with external springs as opposed to the sealing lips 14, 15 of the seals 8a, 8b. For this, a spreading spring 31 is inserted form-locking into the recess 30 for increasing the contact force of the sealing lip on the guiding sleeve 5 and the sealing lip 15 on the pressure housing 2.

Figure 6:
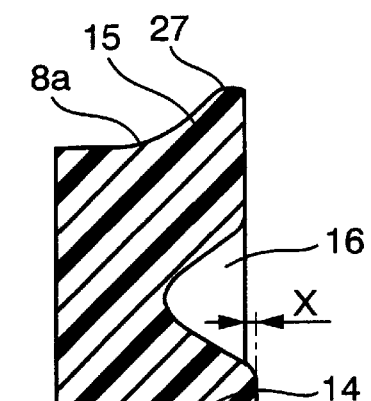
FIG. 6 shows an enlarged cross-sectional profile of the seal of the invention in accordance with FIG. 3.
Figure 7:
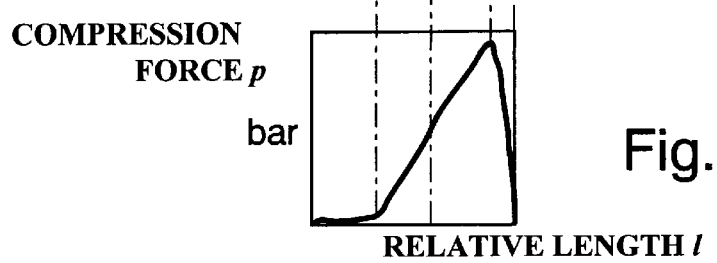
FIG. 7 shows the curve of the pressure gradient "dp/dl" of the seal depicted in FIG. 6.

FIGS. 6 and 7 serve for clarification of the pressure gradient curve "dp/dl" of the seal 8a. The pressure gradient curve describes the compression force "p" plotted on the ordinate over the relative length "l" of the abscissa. See FIG. 7. The curve plot shows a steep rise of the pressure gradient from the pressure chamber side up to reaching the pressure edge 26, 27. From this pressure profile peak, a continuously falling pressure gradient occurs, the lowest value of which occurs approximately in the area of half the width of the back 17a of the seal.

Figure 8:
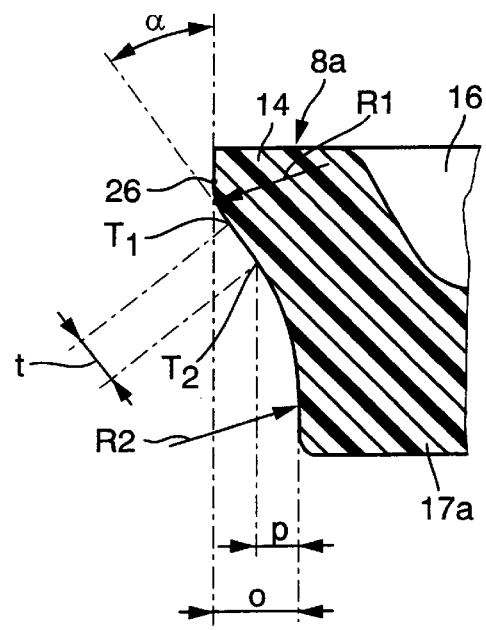
FIG. 8 shows an enlarged cross-sectional view of the seal profile in half section for clarification of the external contour course.

For attaining the previously described pressure gradient curve of the invention, FIG. 8 shows the seal 2 in half section in an enlarged scale. The subsequently described outer contour course is provided in accordance with the invention for both sealing lips 14, 15. Proceeding from pressure chamber 9, sealing lip 14 first of all has a cylindrical outer contour which extends up to a seal edge 26, from which a radius "$R_1$" extends a point of tangency "$T_1$" which connects to a segment "t." The radius "$R_2$" adjoins the segment "t" at a point of tangency "$T_2$" and extends to the back of the seal 17a. As can be understood from FIG. 8, the radius "$R_2$" is clearly greater than the radius "$R_1$." The segment "t" here extends at an angle α of ≧30° toward the cylindrical outer contour of the sealing lip 14. For establishing the previously described outer contour of the sealing lip 14, a radial proportion of dimensions was determined which provides a value of ≧0.5 for the radial dimension "p" divided by the radial dimension "o".

Figure 9:
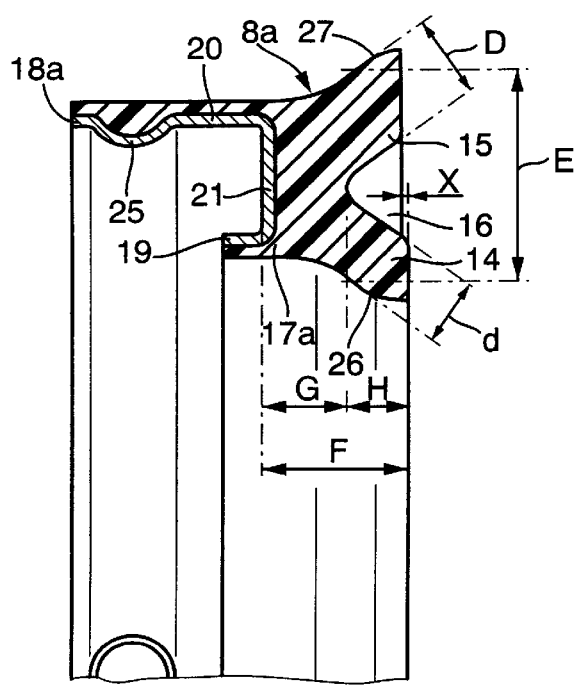
FIG. 9 shows the seal in accordance with FIG. 3 which is supplemented with indications on individual segments of the seal to clarify the geometric proportions.

FIG. 9 serves for further establishing the seal profile of the invention and its design, in which various segments of the seal 8a are characterized and subsequently named. The radial distance dimension is identified with the letter "E" which arises in the installed state of seal 8a between the contact surfaces of the sealing lips 14, 15. The overall sealing ring width, including the reinforcement 18a, is identified by the letter "F." The width of the back 17a of the sealing ring is identified by the letter "G." The axial length of the radially inner sealing lip 14 is designated with the letter "H."

Figure 10:
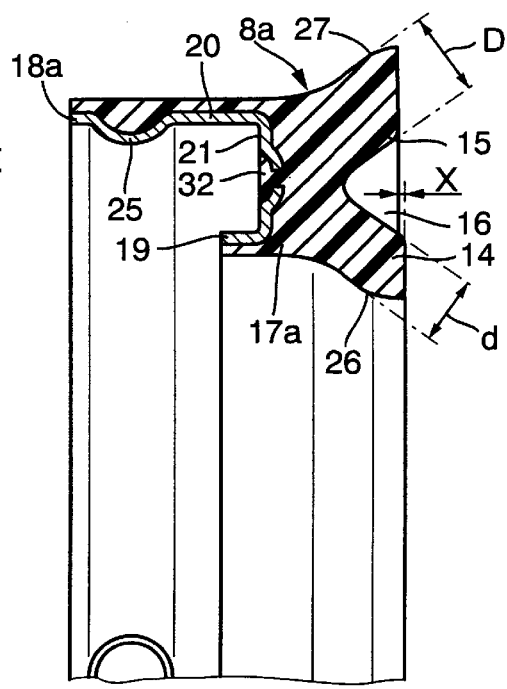
FIG. 10 also shows a drawing similar to FIG. 3 in which the reinforcement is provided with a recess in the area of the plane surface, the end zone of which forms an axial step taking shape in the direction of the back of the seal.

An alternatively configured reinforcement 18a is represented in FIG. 10 which has a recess 32 in the area of the plane surface 21. The structure of the reinforcement 18a as well as of the seal 8a otherwise corresponds to FIG. 3. The recess 32 brings about a pressure equilibrium during the manufacturing process of the seal 8a, thereby preventing a disadvantageous permanent deformation of the reinforcement 18a. The one stage of the reinforcement 18a reaching in the direction of the back of the seal 17a represented in FIG. 10 represents a form-locking connection of the sealing material to the reinforcement 18a.

REFERENCE NUMBER LIST

1 Disconnect system
2 Pressure housing
3 Gear box input shaft
4 Gear box housing
5 Guiding sleeve
6 Jacket surface
7 Ring piston
8a Seal
8b Seal
8c Seal
9 Pressure chamber
10 Release bearing
11 Pressure connection
12 Supply channel
13 Ring flange
14 Sealing lip
15 Sealing lip
16 Recess
17a Back of the seal
17b Back of the seal
17c Back of the seal
18a Reinforcement
18b Reinforcement
19 Leg
20 Leg
21 Plane surface
22 Ledge
23 Ledge
24 Piston groove
25 Catch
26 Pressure edge
27 Pressure edge
28 Leg
29 Catch
30 Recess
31 Spreading spring
α Angle
a Axial play
r Radial play
d Wall thickness
D Wall thickness
x Difference in length
y Radial offset
Z Detail
E Compartment
F Seal width
G Width of the back of the seal H Sealing lip length
o Radial dimension: Back of the seal-seal edge
p Radial dimension: Back of the seal-$T_2$
$R_1$ Radius
$R_2$ Radius
S Sheet thickness
t Segment
$T_1$ point of tangency
$T_2$ point of tangency

What is claimed is:

1. Hydraulically controlled disconnect system for a friction clutch of motor vehicles with a manually shiftable gear box, the disconnect system including a slave cylinder with a pressure housing (2) which is arranged concentrically in relation to a gear box input shaft (3) which connects an internal combustion engine with the gear box, a guiding sleeve (5) is arranged radially apart from and in a longitudinal bore of the pressure housing (2) to form a circularly configured pressure chamber (9), and a ring piston (7) is guided and axially movable in the pressure chamber (9) and includes a reinforced seal (8a, 8b) on the pressure chamber side, the reinforced seal (8a, 8b) having sealing lips (14, 15) which are arranged radially spread apart to form a V-shaped recess, the seal (8a, 8b) characterized with the following structure:

the radially outer sealing lip (15) has a greater wall thickness in comparison with the radially inner sealing lip (14);

an axial length of the inner sealing lip (14), proceeding from a back (17a, 17b) of the seal or a plane surface of the seal (8a, 8b), exceeds an axial length of the outer sealing lip (15); and a reinforcement (18a, 18b) connected to the seal (8a, 8b) to form-lock the seal on the piston ring (7) with an axial play "a" and a radial play ""r", wherein 0 mm >"a">2 mm and 0 mm>"r">1.5 mm.

2. Hydraulically controlled disconnect system for a friction clutch of motor vehicles with a manually shiftable gear box, the disconnect system including a slave cylinder with a pressure housing (2) which is arranged concentrically in relation to a gear box input shaft (3) which connects an internal combustion engine with the gear box, a guiding sleeve (5) is arranged radially apart from and in a longitudinal bore of the pressure housing (2) to form a circularly configured pressure chamber (9), and a ring piston (7) is axially guided and movable in the pressure chamber (9) and includes a seal (8c) on the pressure chamber side, the seal (8c) having sealing lips (14, 15) which are arranged radially spread apart in a V-shape, the seal (8c) being characterized by:

the seal having a one-piece construction with an axially projecting extension (28) from the sealing material and is fastened by form-locking on the ring piston (7) with the form-locking providing an axial play "a" and a radial play ""r", wherein 0 mm>"a">2 mm and 0 mm>"r">1.5 mm;

the radial outer sealing lip (15) has a greater wall thickness in comparison with the radially inner sealing lip (14); and the inner sealing lip (14) has an axial length proceeding from a back (17c) of the seal (8c) which exceeds an axial length of the outer sealing lip (15).

3. Disconnect system according to claim 1, characterized in that the seal (8a, 8b, 8c) has a cross section profile with the sealing lips (14, 15) being arranged asymmetrically in relation to each other.

4. Disconnect system according to claim 1, characterized in that the reinforcement (18a, 18b) includes an extension (20) which radially overlaps the ring piston (7), and a catch (25) directed radially toward the ring piston (7) is provided on a free end of the extension (20) which latches into a piston groove (24) in an installed position.

5. Disconnect system according to claim 2, characterized in that the extension (28) radially overlaps the ring piston (7), and a catch (29) directed radially toward the ring piston (7) is provided on a free end of the extension (28) which latches into a piston groove (24) in an installed position.

6. Disconnect system according to claim 4, characterized in that the reinforcement (18a, 18b) includes two extensions (19, 20) one of the extensions (20) being a radially outer extension (20) on an end side which overlap the ring piston (7), and the catch (25) is provided on the radially outer extension (20).

7. Disconnecting system according to claim 1, characterized in that the reinforcement (18b) overlaps a back (17b) of the seal (8b) in a form-locking manner.

8. Disconnect system according to claim 7, characterized in that at least a portion of the outside area of the extension (19) of the reinforcement (18a) is coated with sealing material.

9. Disconnect system according to claim 4, characterized in that the catch (25) is configured as a radially inwardly directed circular torus.

10. Disconnect system according to claim 8, characterized in that the catch (25) is formed without cutting following coating of the extension (19).

11. Disconnect system according to claim 1, characterized in that the reinforcement (18a) has at least one recess (32) in an area of the plane surface (21).

12. Disconnect system according to claim 2, characterized in that a spreading spring (31) is inserted on the pressure chamber side into a recess (30) of the seal (8c) for strengthening a contact force of the sealing lips (14, 15).

13. Disconnect system according to claim 2, characterized in that the seal (8c) is made of PTFE.

14. Disconnect system according to claim 1, characterized in that the reinforcement (18a, 18b) is formed of steel plate, a wall thickness of which has a dimension of at least 0.3 mm, in the plane surface area (21).

15. Disconnect system according to claim 14, characterized in that the plate thickness of the reinforcement (18a) has a maximum wall thickness of 90% of a width "G" of the back (17a) of the seal.

16. Disconnect system according to claim 1, characterized by the V-shaped recess (16, 30) between the sealing lips (14, 15) having a center which is radially offset a distance "Y" in relation to a center of the pressure chamber.

17. Disconnect system according to claim 1, characterized in that the sealing lips (14, 15) each have a wall thickness which is generally constant proceeding from a free end to reaching the back (17a, 17b, 17c) of the seal.

18. Disconnect system according to claim 1, characterized in that a difference in wall thickness between the sealing lips (14, 15) is greater than 10%.

19. Disconnect system according to claim 1, characterized in that, an axial projection of the one sealing lip (14) has a difference in length "X" in relation to the other sealing lip (15), with "X" being $\leq 4$ mm.

20. Disconnect system according to claim 1, characterized by the seal (8a, 8b, 8c) having a sealing profile, with the radially inner sealing lip (14) having the following dimensional proportions in relation to other segments of the seal (8a, 8b, 8c):

seal width "F"/radial dimension of the seal in an installed state "E"=0.5 to 1 width of the back of the seal "G"/Seal width "F"=0.4 to 0.8.

21. Disconnect system according to claim 1, characterized in that the seal (8a, 8b, 8c) has an exterior contour in an area of the sealing lips (14, 15) in connection with which a radius $R_1$ is provided in a transition zone between a cylindrical segment on the free end of the sealing lips (14, 15) and an oblique segment "t" of the seal edge (26, 27) area which extends in a direction of the back (17a, 17b, 17c) of the seal at $\geq 30°$ and which passes over into the segment "t" at a point of tangency "$T_1$", and a radius $R_2$ is provided in a transition zone between the back (17a, 17b, 17c) of the seal and the segment "t", the point of tangency "$T_2$" between the "t" and the radius "$R_2$" being the same as or spaced a distance from "$T_1$".

22. Disconnect system according to claim 21, characterized in that the course of the outer contour of the sealing lips (14, 15) includes a radial dimension relationship "p" divided by "o"$\geq 0.5$, where "o" is a radial dimension between the back (17a, 17b, 17c) of the seal and the seal edge (26, 27), and "p" is a distance between the back (17a, 17b, 17c) of the seal and the point of tangency "$T_2$."

23. Disconnect system according to claim 21, characterized in that a dimension of $\geq 0$ is provided for the segment "t."

* * * * *